US012516982B2

(12) United States Patent
Lee et al.

(10) Patent No.: US 12,516,982 B2
(45) Date of Patent: Jan. 6, 2026

(54) LINEAR POLARIZATION COMPONENT DETECTION SYSTEM AND METHOD

(71) Applicant: National Central University, Taoyuan (TW)

(72) Inventors: Ju-Yi Lee, Taoyuan (TW); You-Jun Lin, Taoyuan (TW)

(73) Assignee: National Central University, Taoyuan (TW)

(*) Notice: Subject to any disclaimer, the term of this patent is extended or adjusted under 35 U.S.C. 154(b) by 201 days.

(21) Appl. No.: 18/377,381

(22) Filed: Oct. 6, 2023

(65) Prior Publication Data

US 2024/0377259 A1   Nov. 14, 2024

(30) Foreign Application Priority Data

May 11, 2023   (TW) .................................. 112117592

(51) Int. Cl.
*G01J 4/04*   (2006.01)
(52) U.S. Cl.
CPC ...................................... *G01J 4/04* (2013.01)
(58) Field of Classification Search
CPC ...... G01J 4/04; G01J 3/447; G01J 4/00; G01J 3/0208; G01J 3/0224; G01J 3/0235; G01J 9/04; G01J 3/2823; G01J 2003/1213; G01J 2003/1221; G01J 2003/2826; G01J 3/0229; G01J 4/02; G01J 3/0237; G01J 3/28; G01J 3/32; G01J 5/10; G01J 9/00; G01J 2009/002; G01J 3/26; G01J 9/0215; G01B 2290/70; G01B 11/2441; G01B 11/26; G01B 9/02007; G01B 9/02027; G01B 9/02081; G01B 11/0608; G01B 9/02024; G01B 9/0203; G01B 9/02083; G01B 11/022; G01B 11/0641; G01B 11/065; G01B 9/02; G01B 11/303; G01B 11/00; G01B 2290/45; G01B 9/02015;

(Continued)

(56) References Cited

U.S. PATENT DOCUMENTS 6,157,448 A * 12/2000 Kowa ........................ G01J 4/00
356/365
6,480,277 B1 * 11/2002 Nafie ....................... G01J 3/447
250/339.08

(Continued)

FOREIGN PATENT DOCUMENTS

CN       101499295 A  *  8/2009  ........... G11B 7/1365
CN       104931234 A  *  9/2015
(Continued)

*Primary Examiner* — Michael P Stafira
(74) *Attorney, Agent, or Firm* — Demian K. Jackson; Jackson IPG PLLC (57) ABSTRACT

The present invention relates to a linear polarization component detection system. The system includes elements of a light source configured to emit a detection beam propagating along an optical path; a linear polarization component to be tested configured in the optical path and providing for the detection beam to pass through and transform into a polarized beam; a wave plate configured in the optical path and providing for the polarized beam to pass through and transform into a polarized interference beam; and a phase retrieval device configured to receive the polarized interference beam and sense a light intensity signal from the polarized interference beam.

8 Claims, 5 Drawing Sheets

(58) Field of Classification Search
CPC .............. G01B 9/02057; G01B 11/254; G01B 11/306; G01B 2210/56; G01B 2290/25; G01B 9/02002; G01B 9/02003; G01B 9/02004; G01B 9/02011; G01B 9/02039; G01B 9/02042; G01B 9/02056; G01B 9/02061; G01B 9/02064; G01B 9/02072; G01N 21/21; G01N 21/23; G01N 21/211; G01N 2021/217; G01N 21/25; G01N 21/01; G01N 2021/213; G01N 2021/216; G01N 21/41; G01N 21/47; G01N 21/956; G01N 2223/605; G01N 2291/012; G01N 15/06; G01N 15/075; G01N 2015/0053; G01N 2021/8848; G01N 21/534; G01N 21/9501; G01N 2201/127; G01N 33/18; G01N 15/0211; G01N 21/27; G01N 21/274; G01N 21/31; G01N 21/3581; G01N 21/6458; G01N 2201/02; G01N 2201/0675; G01N 2201/0683; G01N 2021/4707; G01N 2021/4792; G01N 2021/8918; G01N 2021/95676; G01N 21/19; G01N 21/8806; G01N 21/8851; G01N 2201/068; G01N 2021/177; G01N 21/49; G01N 21/8422; G01N 2291/023; G01N 29/041; G01N 29/048
See application file for complete search history.

(56) References Cited

U.S. PATENT DOCUMENTS

| | | | | |
|---|---|---|---|---|
| 8,705,034 | B2 * | 4/2014 | Fukazawa | G01N 21/21 |
| | | | | 356/369 |
| 9,976,947 | B1 * | 5/2018 | Hoffer, Jr. | G01B 11/002 |
| 10,578,885 | B2 * | 3/2020 | Sasaki | G02B 27/285 |
| 2019/0353995 | A1 * | 11/2019 | Pan | H04N 9/3155 |
| 2023/0068524 | A1 * | 3/2023 | Oza | G01S 7/4812 |
| 2023/0141269 | A1 * | 5/2023 | Zhou | G02B 27/1006 |
| | | | | 436/66 |

FOREIGN PATENT DOCUMENTS

| | | | | | |
|---|---|---|---|---|---|
| CN | 105466561 | B | * | 9/2017 | ............... G01J 4/00 |
| CN | 107024277 | B | * | 5/2018 | ............... G01J 4/04 |
| CN | 109163673 | A | * | 1/2019 | ............ G01B 11/30 |
| CN | 107272307 | B | * | 11/2020 | ........ G02B 26/0883 |
| CN | 115031928 | A | * | 9/2022 | ........ G01M 11/0242 |
| CN | 115389430 | A | * | 11/2022 | ............ G01N 21/21 |
| JP | 2000046730 | A | * | 2/2000 | |
| JP | 2002116085 | A | * | 4/2002 | |
| JP | 2009058464 | A | * | 3/2009 | |
| JP | 2014074650 | A | * | 4/2014 | |
| KR | 20150093569 | A | * | 8/2015 | ............... G01L 1/24 |
| TW | 201421029 | A | * | 6/2014 | ......... A61B 5/14532 |
| TW | 202102841 | A | | 1/2021 | |

* cited by examiner

LINEAR POLARIZATION COMPONENT DETECTION SYSTEM AND METHOD

CROSS-REFERENCE TO RELATED APPLICATION

This application claims priority benefit to Taiwan Invention patent application Ser. No. 112117592, filed on May 11, 2023, in Taiwan Intellectual Property Office, the entire disclosures of which are incorporated by reference herein.

FIELD

The present invention relates to a linear polarization component detection system and method, in particular to a linear polarization component detection system and method for detecting a transmission axis angle of a linear polarization component.

BACKGROUND

With the increasing widespread application of polarizers, there is a growing demand for more precise specifications of polarizing components. The more precise the polarizer, the more meticulous each step of its manufacturing process needs to be. However, during the manufacturing process of polarizers, it is easy to arise issues with inaccurate angles of transmission axes. Polarizers with inaccurate angles of transmission axes lead to various problems in optical end products.

For instance, the angle of transmission axis of a polarizer is highly correlated to the design of optical systems. If the angle of transmission axis is incorrect, it can degrade the optical performance of the system, including reduced image resolution, color fidelity, contrast, and brightness. Furthermore, polarizers with inaccurately aligned transmission axes can produce interference effects such as polarizing interference fringes, which affect the observation of optical products. In products like 3D glasses, the use of polarizers with inaccurate angles of transmission axes may result in incomplete separation of images seen by the left and right eyes, leading to interference or ghost effect and affecting user experience. In additional, polarizers with inaccurate angles of transmission axes introduce additional optical errors. For example, in optical measurement or communication systems, inaccuracies in the angle of transmission axis of polarizers can lead to measurement results with errors, impacting system accuracy and reliability.

Therefore, in the manufacturing and application of polarizers, in addition to using precise manufacturing techniques and accurately controlling the angle of transmission axis to ensure optimal performance and quality of optical end products, it is also very important to accurately, simply, and quickly detect the angle of transmission axis of polarizers, in order to find out and remove defective polarizers from the production line. In terms of commonly used techniques, there are roughly three types of methods to detect the angle of transmission axis of polarizers.

The first type is polarimetry, which involves rotating the polarizer and observing changes in light intensity. When the light intensity is at its minimum, the angle of transmission axis of the polarizer is perpendicular to the polarization direction of the light. By rotating the polarizer multiple times, the angle of transmission axis can be determined. Although this method is quick and straightforward, its accuracy is not satisfied. The second type of methods is interferometry. It involves placing the test polarizer between two mutually perpendicular polarizers and observing changes in optical interference fringes, so as to detect the angle of transmission axis. This method offers high accuracy but requires large optical interferometers and longer measurement times. The third type is image analysis, which involves capturing transmitted light images of the polarizer and then using image analysis techniques to determine polarization direction and intensity to detect the angle of transmission axis. This method requires specialized image processing software and precise image capture devices.

However, considering these conventional detection methods, most of them require large equipment, come with relatively high implementation costs, and have longer measurement times. Due to these drawbacks, there is a need to solve the above deficiencies/issues. Hence, the inventor has diligently attempted and researched and, with unwavering dedication, conceived the present "Linear Polarization Component Detection System and Method" described in this disclosure. This system and method can accurately, simply, and rapidly determine the angle of transmission axis of polarizers, overcoming the aforementioned limitations. The following is a description of the invention.

SUMMARY

The present invention relates to a linear polarization component detection system and method, in particular to a linear polarization component detection system and method for detecting a transmission axis angle of a linear polarization component.

Accordingly, the present invention provides a linear polarization component detection system. The system includes elements of a light source configured to emit a detection beam propagating along an optical path; a linear polarization component to be tested configured in the optical path and providing for the detection beam to pass through and transform into a polarized beam; a wave plate configured in the optical path and providing for the polarized beam to pass through and transform into a polarized interference beam; and a phase retrieval device configured to receive the polarized interference beam and sense a light intensity signal from the polarized interference beam.

The present invention further provides a linear polarization component detection method. The method includes steps of configuring a light source, a linear polarization component to be tested, a wave plate, and a phase retrieval device along an optical path in sequence; continuously rotating the wave plate; activating the light source to project a detection beam to pass through the linear polarization component to be tested and the wave plate and transform into a polarized interference beam; and receiving the polarized interference beam through the phase retrieval device and sensing an light intensity signal of the polarized interference beam.

The above content described in the summary is intended to provide a simplified summarization for the presently disclosed invention, so that readers are able to have an initial and basic understanding to the presently disclosed invention. The above content is not aimed to reveal or disclose a comprehensive and detailed description for the present invention, and is never intended to indicate essential elements in various embodiments in the present invention, or define the scope or coverage in the present invention.

DESCRIPTION OF THE DRAWINGS

A more complete appreciation according to the present invention and many of the attendant advantages thereof are readily obtained as the same become better understood by reference to the following detailed description when considered in connection with the accompanying drawing, wherein.

DETAILED DESCRIPTION

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice. It is clear that other embodiments can be configured according to the knowledge of persons skilled in the art without departing from the true technical teaching of the present disclosure, the claimed disclosure being limited only by the terms of the appended claims.

It is to be noticed that the term "including" used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

Figure 1:
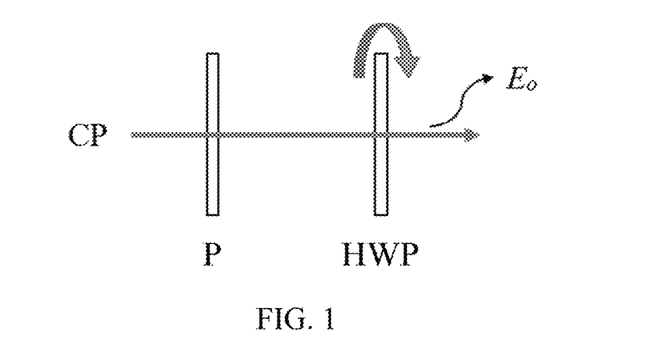
FIG. 1 is a schematic diagram illustrating the optical principle of the linear polarization component detection system according to the present invention.
Figure 2:
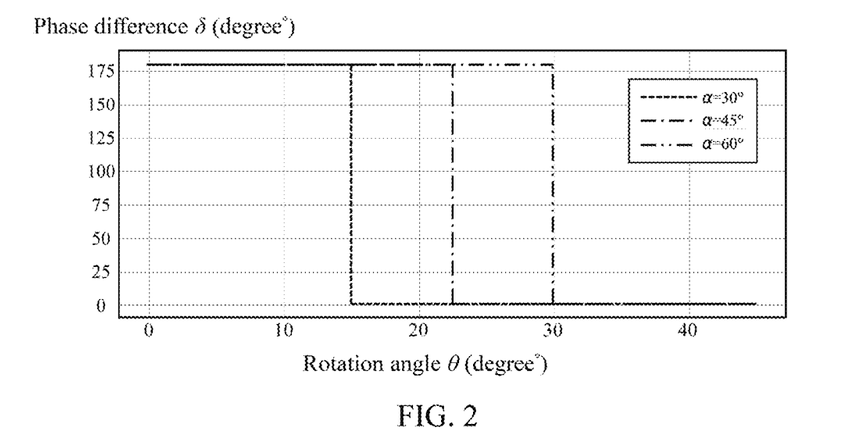
FIG. 2 is a schematic diagram illustrating the relationship between the rotation angle θ of the wave plate and the phase difference δ according to the present invention.

FIG. 1 is a schematic diagram illustrating the optical principle of the linear polarization component detection system according to the present invention. FIG. 2 is a schematic diagram illustrating the relationship between the rotation angle θ of the wave plate and the phase difference δ according to the present invention. The present invention utilizes the rotation of the wave plate to induce changes in the phase difference of the polarized light. Then, by analyzing variation of the phase difference curve, the polarization direction of the polarizer, either the transmission axis direction or the transmission axis angle α, is obtained accordingly.

The linear polarization component detection system according to the present invention is operated based on the optical principle, as shown in FIG. 1. In FIG. 1, an ordinary light beam or a circularly polarized light CP is incident on the linear polarization component to be tested P. At this initial stage, the intensity of the light beam passing through the linear polarization component to be tested P is not affected by the transmission axis angle α. The measurement system included in the present invention utilizes the rotation of a half-wave plate HWP to cause changes in the phase difference for the beam light passing through the linear polarization component to be tested P.

When the circularly polarized light CP passes through the linear polarization component to be tested P and the half-wave plate HWP, the electric field $E_0$ of the polarized light can be represented using Jones matrices and written as:

$$E_o = HWP(\theta)P(\alpha)CP = \begin{pmatrix} \cos2\theta & \sin2\theta \\ \sin2\theta & -\cos2\theta \end{pmatrix}\begin{pmatrix} \cos^2\alpha & \sin\alpha\cos\alpha \\ \sin\alpha\cos\alpha & \sin^2\alpha \end{pmatrix}\begin{pmatrix} 1 \\ i \end{pmatrix} = \begin{pmatrix} \exp(i\delta_s) \\ \exp(i\delta_p) \end{pmatrix} \quad (1)$$

In above equation (1), HWP(θ) represents a half-wave plate HWP with its fast axis at an angle of 0° degrees. P(α) denotes the linear polarization component to be tested P with its transmission axis at an angle of α°. The linear polarization component to be tested P is preferably a linear polarizer. The subscripts "s" and "p" represent the s-polarized light and p-polarized light, respectively. The phase differences δs and δp for the s-polarized light and p-polarized light, respectively, are given as follows:

$$\delta_s = \tan^{-1}\frac{\sin\alpha\sin(2\theta-\alpha)}{\cos\alpha\sin(2\theta-\alpha)} \quad (2)$$

$$\delta_p = \tan^{-1}\frac{\sin\alpha\cos(2\theta-\alpha)}{\cos\alpha\cos(2\theta-\alpha)} \quad (3)$$

The phase difference δ is expressed as:

$$\delta = \delta_p - \delta_s = \tan^{-1}\frac{\sin\alpha\cos(2\theta-\alpha)}{\cos\alpha\cos(2\theta-\alpha)} - \tan^{-1}\frac{\sin\alpha\sin(2\theta-\alpha)}{\cos\alpha\sin(2\theta-\alpha)} \quad (4)$$

From equation (4), it is observed that the value of δ only changes its positive and negative sign when cos(2θ−α) and sin(2θ−α) change their positive and negative sign. It occurs at multiples of 2θ−α=0 or π. By simulating equation (4) using a program, the relationship between the rotation angle θ and the phase difference δ of the half-wave plate HWP as demonstrated in FIG. 2 is obtained.

Rotate the half-wave plate HWP when the transmission axis angle α of the linear polarization component to be tested P is set to 30°. When the half-wave plate HWP rotate to an angle θ of 15°, the phase difference δ thereof is induced to have a significant variation, as depicted by the solid line in FIG. 2. Similarly, rotate the half-wave plate HWP when the transmission axis angle α of the linear polarization component to be tested P is set to 45°. When the half-wave plate HWP rotate to an angle θ of 22.5°, the phase difference δ has a significant variation, as shown by the dotted chain line in FIG. 2. Likewise, when the transmission axis angle α is set to 60°, the phase difference δ has a significant variation at a rotation angle θ=30°, as indicated by the double-chain line in FIG. 2.

From equation (4) and the results obtained through program simulation, it is deduced that there is a twice relationship between the significant changes in the transmission axis angle α and the phase difference δ of the linear polarization component to be tested P with respect to the rotation angle θ of the half-wave plate HWP. Therefore, by obtaining the rotation angle θ value at the maximum change in the phase difference curve correspondingly, the transmission axis angle α of the linear polarization component to be tested P is determined as α=2θ.

Figure 3:
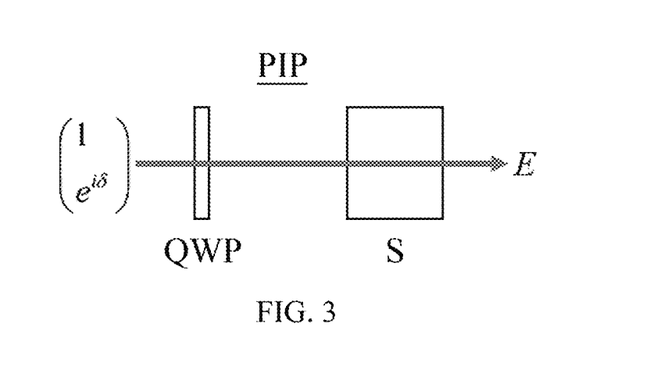
FIG. 3 is a schematic diagram illustrating the optical principle for the polarized interference phase retrieval device according to the present invention.

FIG. 3 is a schematic diagram illustrating the optical principle for the polarized interference phase retrieval device according to the present invention. The polarized interference phase retrieval device PIP proposed in the present invention comprises a quarter-wave plate QWP and a polarization beam splitter S. By rendering light to pass through the quarter-wave plate QWP and then combining the split light using the polarization beam splitter S or capturing the light intensities at four different polarization directions using a polarization camera, the phase difference can be obtained by calculation. The optical principle of the polarized interference phase retrieval device PIP is illustrated in FIG. 3.

It is assumed that a polarized light provides an s-polarized light and a p-polarized light which have a phase difference δ, after passing through the polarized interference phase retrieval device PIP, the electric field E and its light intensity I can be represented using Jones matrices as:

$$E = \begin{pmatrix} \cos^2\beta & \sin\beta\cos\beta \\ \sin\beta\cos\beta & \sin^2\beta \end{pmatrix} \begin{pmatrix} 1 & -i \\ -i & 1 \end{pmatrix} \begin{pmatrix} 1 \\ e^{j\delta} \end{pmatrix} \quad (5)$$

$$I = E \cdot E^* = 1 + \sin(2\beta + \delta) \quad (6)$$

In the equations (5) and (6), β represents the polarization direction. When the four polarization directions are 0°, 90°, 45°, and 135° respectively, the corresponding light intensities are expressed as:

$$I_0 = 1 + \sin\delta \quad (7)$$
$$I_{90} = 1 - \sin\delta \quad (8)$$
$$I_{45} = 1 + \cos\delta \quad (9)$$
$$I_{135} = 1 - \cos\delta \quad (10)$$

By using the arctangent function, the phase difference δ can be resolved as:

$$\delta = \tan^{-1}\left(\frac{I_0 - I_{90}}{I_{45} - I_{135}}\right) \quad (11)$$

Figure 4:
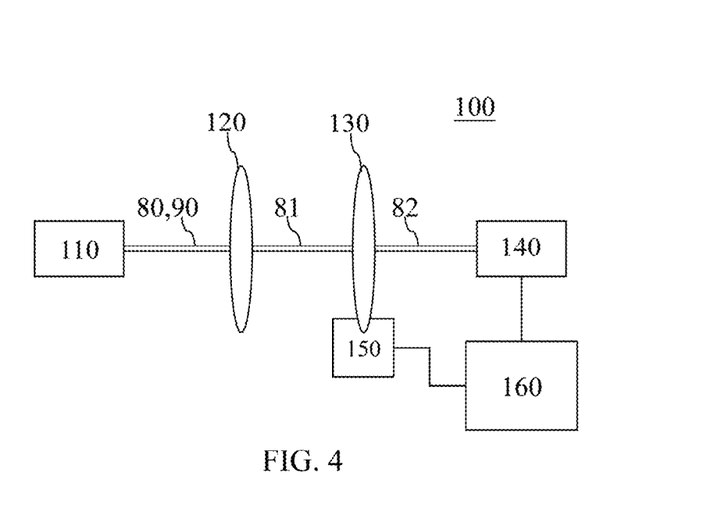
FIG. 4 is a schematic diagram illustrating the system architecture for the first embodiment of the linear polarization component detection system according to the present invention.

FIG. 4 is a schematic diagram illustrating the system architecture for the first embodiment of the linear polarization component detection system according to the present invention. The linear polarization component detection system 100 is designed to detect a transmission axis direction of a linear polarization component, and the system architecture thereof is shown in FIG. 4. The linear polarization component detection system 100 includes a light source 110, a linear polarization component to be tested 120, a wave plate 130, a phase retrieval device 140, a motor 150, and a computerized control and detection module 160.

In an embodiment, it is assumed that the light source 110 serves as the starting point of the optical path 90, and the phase retrieval device 140 serves as the endpoint of the optical path 90. Along the optical path 90, the light source 110, the linear polarization component to be tested 120, the wave plate 130, and the phase retrieval device 140 are arranged in sequence as shown in FIG. 4. When the detection beam 80 is emitted from the light source 110, it propagates along the optical path 90 and terminates at the phase retrieval device 140. In this embodiment, the geometric form of the optical path 90 is preferably linear.

Figure 5:
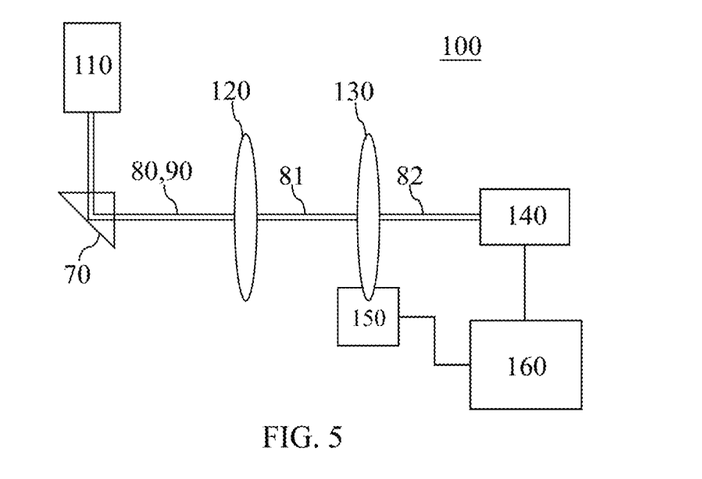
FIG. 5 is a schematic diagram illustrating the system architecture for the second embodiment of the linear polarization component detection system according to the present invention.

FIG. 5 is a schematic diagram illustrating the system architecture for the second embodiment of the linear polarization component detection system according to the present invention. In an embodiment, the linear polarization component detection system 100 includes an optical reflector 70, such as a mirror, which is preferably configured between, for example, but not limited to, the light source 110 and the linear polarization component to be tested 120, so as to change the propagation direction of the detection beam 80 and the geometric form of the optical path 90. In this embodiment, the geometric form of the optical path 90 is preferably L-shaped, but the geometric form of the optical path 90 is not limited to linear or L-shaped configurations.

Figure 6:
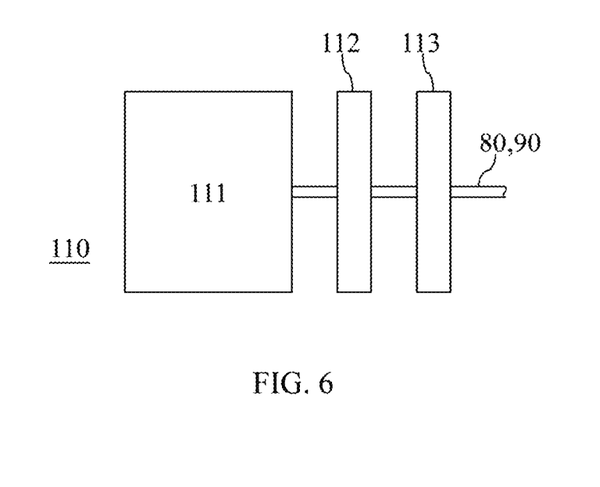
FIG. 6 is a schematic diagram illustrating the structure for the light source included in the linear polarization component detection system according to the present invention.

FIG. 6 is a schematic diagram illustrating the structure for the light source included in the linear polarization component detection system according to the present invention. The light source 110 preferably includes a light source emitter 111, which emits the detection beam 80. The detection beam 80 propagates along the optical path 90. The detection beam 80 is not limited to polarized light, and detection beam 80 can be non-polarized light or polarized light. The detection beam 80 can also be laser light or LED light. Therefore, the light source 110 covers various types of light emitters, including but not limited to laser emitters, LED emitters, non-polarized light emitters, or polarized light emitters.

When the light source 110 is a polarized light emitter, it further includes a polarizer 112 configured in the front end of the light source emitter 111. The polarizer 112 is preferably a linear polarizer or a circular polarizer, to render the detection beam 80 being polarized. In front of the polarizer 112, an aperture 113 is configured to filter the detection beam 80 to transform it into a cleaner point light source.

After being emitted from the light source 110, the detection beam 80 propagates along the optical path 90 and enters the linear polarization component to be tested 120. Then the detection beam 80 passes through the linear polarization component to be tested 120 and becomes a polarized beam 81. In this embodiment, the linear polarization component to be tested 120 has a transmission axis, but the transmission axis angle thereof is yet unknown and requires to be determined.

After leaving the linear polarization component to be tested 120, the polarized beam 81 continues to propagate along the optical path 90, and then enters the wave plate 130. After the polarized beam 81 passes through the wave plate 130, its own phase difference is induced to have a change, and the polarized beam 81 further transforms into a polarized interference beam 82 with a phase difference. In this embodiment, the wave plate 130, which introduces a phase difference to the polarized beam 81, is preferably a half-wave plate or a quarter-wave plate. Furthermore, the wave plate 130 is driven by a motor 150 to rotate continuously, to continuously introduce a phase difference to form a phase difference curve.

Figure 7:
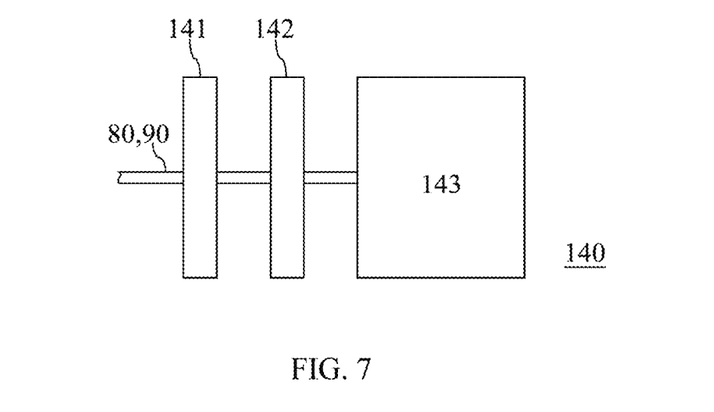
FIG. 7 is a schematic diagram illustrating the structure for the phase retrieval device according to the present invention.
Figure 8:
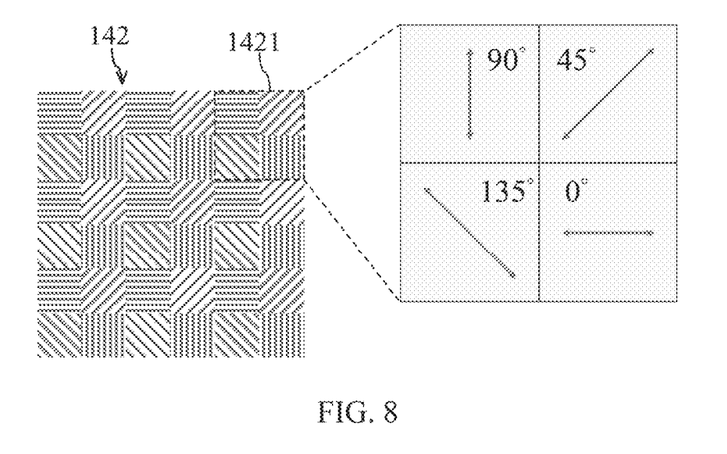
FIG. 8 is a schematic diagram illustrating the structure for the polarizer array included in the phase retrieval device according to the present invention according to the present invention.

FIG. 7 is a schematic diagram illustrating the structure for the phase retrieval device according to the present invention. FIG. 8 is a schematic diagram illustrating the structure for the polarizer array included in the phase retrieval device according to the present invention according to the present invention. The phase retrieval device 140 according to the present invention further includes a wave plate 141, a polarizer array 142, and an image sensor 143. The polarizer array 142 comprises multiple polarizer units 1421, and each polarizer units 1421 consists of a 2×2 pixel array formed by four linear polarizers with a common optical path length, including 0°, 90°, 45°, and 135° linear polarizers. The image sensor 143 is preferably a photodetector (PD), a charge-coupled device (CCD), or a complementary metal-oxide-semiconductor (CMOS) device.

Since the phase retrieval device 140 incorporates linear polarizers with a common optical path length, there is no need to use any beam splitter, which not only reduces the number of optical elements used and the size of the phase retrieval device 140, but also decreases potential sources of errors, thereby improving accuracy.

After leaving the wave plate 130, the polarized interference beam 82 continues to propagate along the optical path 90 and then enters the phase retrieval device 140. The phase retrieval device 140 receives the polarized interference beam 82 and senses its light intensity signal. Next, the phase retrieval device 140 outputs the light intensity signal to the computerized control and detection module 160. The computerized control and detection module 160 converts the light intensity signal into a phase difference.

For example, in an embodiment, the equipment specifications used in the linear polarization component detection system 100 are as follows. The light source 110 includes a helium-neon laser with a wavelength of 632.8 nm and a power of 2.0 mW. The phase retrieval device 140 has a physical aperture diameter ranging from Ø0.8 mm to 20 mm. The linear polarizers contained in multiple polarizer units 1421 have an extinction ratio greater than 5000:1. The wave plate 141 is preferably a ¼ wave plate with a delay error of ±10 nm at 633 nm. The image sensor 143 has, for example, a resolution of 2448×2048 pixels, pixel dimensions of 3.45×3.45 µm, and a variable frame rate ranging from 900 to 10 frames per second. The motor 150 has a maximum rotation speed of approximately 25°/s and a minimum step size of 25 arc seconds.

The linear polarization component detection system 100 includes multiple detecting steps as follows. Firstly, the computerized control and detection module 160 initiates the motor 150 and controls it to drive the wave plate 130 for continuous rotation. The computerized control and detection module 160 controls the rotation speed of the wave plate 130 and records its rotation angle. Next, the light source 110 is turned on to project the detection beam 80. The detection beam 80 travels along the optical path 90, passes sequentially through the linear polarization component to be tested 120 and the wave plate 130, and finally reaches the phase retrieval device 140 in the form of the polarized interference beam 82.

Figure 9:
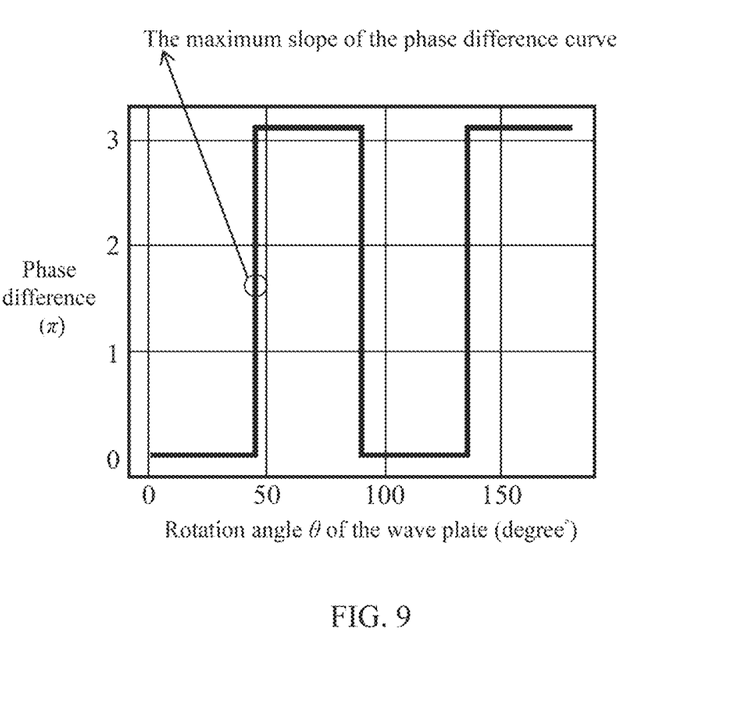
FIG. 9 is a schematic diagram illustrating the phase difference curve output by the linear polarization component detection system according to the present invention.

FIG. 9 is a schematic diagram illustrating the phase difference curve output by the linear polarization component detection system according to the present invention. The phase retrieval device 140 senses the light intensity signal of the polarized interference beam 82 and outputs the light intensity signal to the computerized control and detection module 160. Upon receiving the light intensity signal, the computerized control and detection module 160 converts the light intensity signal into a phase difference and records the corresponding rotation angle of the wave plate 130. The computerized control and detection module 160 continuously records the rotation angles of the wave plate 130 along with their corresponding phase differences, to form and draw the phase difference curve as shown in FIG. 9 finally.

The phase difference curve as shown in FIG. 9 demonstrates that even a minor rotation of the wave plate 130 can generate a significant and substantial change in the phase difference. This characteristic can be utilized for precisely determining the transmission axis angle for the linear polarization component to be tested 120.

Once the computerized control and detection module 160 obtains the phase difference curve, it only needs to determine a target rotation angle of the wave plate corresponding to the maximum slope of the phase difference curve. Then, the value of twice the target rotation angle represents the transmission axis angle or the transmission axis direction for the linear polarization component to be tested 120.

The proposed linear polarization component detection system and method according to the present invention do not require controlling the polarization state of the incident light. It can utilize an ordinary unpolarized light source. The measurement has a resolution that can reach up to 0.03° and the standard deviation for repeated measurements is within 0.01°.

The system and method according to the present invention are primarily used for detecting and determining the transmission axis angle for a linear polarization component. It enables fast and accurate determination of the transmission axis angle for any type of linear polarization component, and is applicable to different shapes and sizes of linear polarizing films. It exhibits excellent geometric adaptability, stability, reliability, high precision, and sensitivity, thereby ensuring the accuracy and repeatability of measurement results.

The system and method according to the present invention can be employed in various fields such as optical manufacturing, optical instrument manufacturing, optoelectronics, precision instrument manufacturing, etc., for detecting, measuring, and calibrating any type of linear polarization components. It enables quick identification of defective products and ensures the quality of manufactured linear polarization components. In addition, the system and method according to the present invention can also find applications in fields such as optical metrology, materials science, biomedical research, etc.

The implementation process of the system and method according to the present invention is fully automated and does not require manual intervention. This reduces human interference and errors, thereby improving the accuracy and efficiency of measurement results. Furthermore, it does not require large equipment, and the cost of setup and implementation is also minimal.

Figure 10:
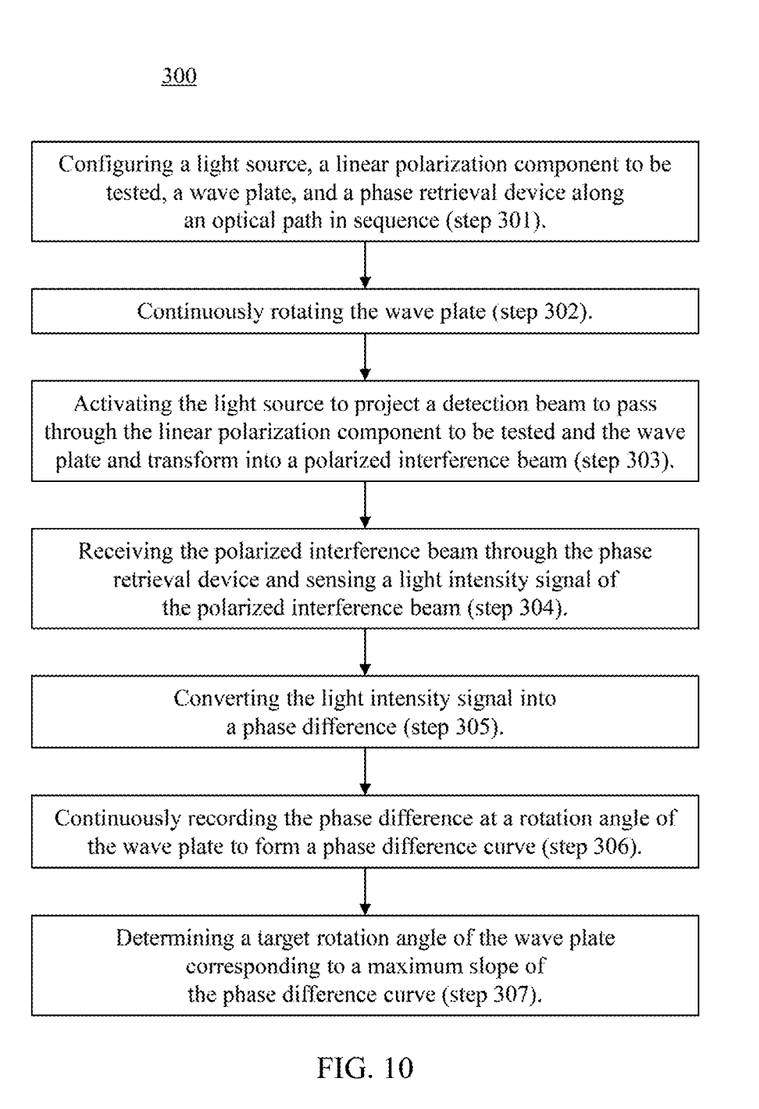
FIG. 10 is a flowchart illustrating the implementation steps included in the linear polarization component detection method according to the present invention.

FIG. 10 is a flowchart illustrating the implementation steps included in the linear polarization component detection method according to the present invention. The linear polarization component detection method 300 according to the present invention preferably includes, but is not limited to, the following steps: configuring a light source, a linear polarization component to be tested, a wave plate, and a phase retrieval device along an optical path in sequence (step 301); continuously rotating the wave plate (step 302); activating the light source to project a detection beam to pass through the linear polarization component to be tested and the wave plate and transform into a polarized interference beam (step 303); receiving the polarized interference beam through the phase retrieval device and sensing an light intensity signal of the polarized interference beam (step 304); converting the light intensity signal into a phase difference (step 305); continuously recording the phase difference at a rotation angle of the wave plate to form a phase difference curve (step 306); and determining a target rotation angle of the wave plate corresponding to a maximum slope of the phase difference curve (step 307).

There are further embodiments provided as follows.

Embodiment 1: A linear polarization component detection system, which includes: a light source configured to emit a detection beam propagating along an optical path; a linear polarization component to be tested configured in the optical path and providing for the detection beam to pass through and transform into a polarized beam; a wave plate configured in the optical path and providing for the polarized beam to pass through and transform into a polarized interference beam; and a phase retrieval device configured to receive the polarized interference beam and sense a light intensity signal from the polarized interference beam.

Embodiment 2: The linear polarization component detection system according to Embodiment 1, the light source further comprises one of the following components: a light source emitter, which is a laser light source emitter or an LED light source emitter, for generating the detection beam; a linear polarizer configured in one side of the light source emitter for converting the detection beam into a linearly polarized light; a circular polarizer configured in one side of the light source emitter for converting the detection beam into a circularly polarized light; and an aperture configured in one side of the linear polarizer or the circular polarizer for filtering the detection beam, the linearly polarized light, or the circularly polarized light.

Embodiment 3: The linear polarization component detection system according to Embodiment 1, the wave plate is a half-wave plate or a quarter-wave plate.

Embodiment 4: The linear polarization component detection system according to Embodiment 1, the phase retrieval device further comprises one of the following components: an image sensor; a polarizer array configured in one side of the image sensor and comprising a plurality of polarizer units, each of the plurality of polarizer units comprising a 0° linear polarizer, a 90° linear polarizer, a 45° linear polarizer, and a 135° linear polarizer with a common optical path; and a wave plate configured in one side of the polarizer array, wherein the wave plate is selected from either a half-wave plate or a quarter-wave plate.

Embodiment 5: The linear polarization component detection system according to Embodiment 1 further comprises one of the following components: a motor configured to drive the wave plate to continuously rotate; a computerized control and detection module configured to perform one of the following steps: control a rotation of the motor; receive the light intensity signal and convert it into a phase difference; record a rotation angle of the wave plate; record the phase difference at the rotation angle correspondingly; continuously record the phase difference at the rotation angle to form a phase difference curve; and determine a target rotation angle of the wave plate corresponding to a maximum slope of the phase difference curve.

Embodiment 6: The linear polarization component detection system according to Embodiment 5, the linear polarization component to be tested has a transmission axis, and the transmission axis has a transmission axis angle that is twice the target rotation angle.

Embodiment 7: A linear polarization component detection method, which includes: configuring a light source, a linear polarization component to be tested, a wave plate, and a phase retrieval device along an optical path in sequence; continuously rotating the wave plate; activating the light source to project a detection beam to pass through the linear polarization component to be tested and the wave plate and transform into a polarized interference beam; and receiving the polarized interference beam through the phase retrieval device and sensing an light intensity signal of the polarized interference beam.

Embodiment 8: The linear polarization component detection method according to Embodiment 7 further comprises one of the following steps: converting the light intensity signal into a phase difference; recording a rotation angle of the wave plate; recording the phase difference at the rotation angle correspondingly; continuously recording the phase difference at the rotation angle to form a phase difference curve; and determining a target rotation angle of the wave plate corresponding to a maximum slope of the phase difference curve.

Embodiment 9: The linear polarization component detection method according to Embodiment 8, the linear polarization component to be tested has a transmission axis, and the transmission axis has a transmission axis angle that is twice the target rotation angle.

Embodiment 10: The linear polarization component detection method according to Embodiment 7, the phase retrieval device further comprises one of the following components: an image sensor; a polarizer array configured in one side of the image sensor and comprising a plurality of polarizer units, each of the plurality of polarizer units comprising a 0° linear polarizer, a 90° linear polarizer, a 45° linear polarizer, and a 135° linear polarizer with a common optical path; and a wave plate configured in one side of the polarizer array, wherein the wave plate is selected from either a half-wave plate or a quarter-wave plate.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. A linear polarization component detection system, comprising:
   a light source configured to emit a detection beam propagating along an optical path;
   a linear polarization component to be tested configured in the optical path and providing for the detection beam to pass through and transform into a polarized beam;
   a wave plate configured in the optical path and providing for the polarized beam to pass through and transform into a polarized interference beam; and a phase retrieval device configured to receive the polarized interference beam and sense a light intensity signal from the polarized interference beam, wherein the linear polarization component detection system further comprises one of the following components:

a motor configured to drive the wave plate to continuously rotate;

a computerized control and detection module configured to perform one of the following steps:

control a rotation of the motor;

receive the light intensity signal and convert it into a phase difference;

record a rotation angle of the wave plate;

record the phase difference at the rotation angle correspondingly;

continuously record the phase difference at the rotation angle to form a phase difference curve; and determine a target rotation angle of the wave plate corresponding to a maximum slope of the phase difference curve.

2. The linear polarization component detection system according to claim 1, wherein the light source further comprises one of the following components:

a light source emitter, which is a laser light source emitter or an LED light source emitter, for generating the detection beam;

a linear polarizer configured in one side of the light source emitter for converting the detection beam into a linearly polarized light;

a circular polarizer configured in one side of the light source emitter for converting the detection beam into a circularly polarized light; and an aperture configured in one side of the linear polarizer or the circular polarizer for filtering the detection beam, the linearly polarized light, or the circularly polarized light.

3. The linear polarization component detection system according to claim 1, wherein the wave plate is a half-wave plate or a quarter-wave plate.

4. The linear polarization component detection system according to claim 1, wherein the phase retrieval device further comprises one of the following components:

an image sensor;

a polarizer array configured in one side of the image sensor and comprising a plurality of polarizer units, each of the plurality of polarizer units comprising a 0° linear polarizer, a 90° linear polarizer, a 45° linear polarizer, and a 135° linear polarizer with a common optical path; and a wave plate configured in one side of the polarizer array, wherein the wave plate is selected from either a half-wave plate or a quarter-wave plate.

5. The linear polarization component detection system according to claim 1, wherein the linear polarization component to be tested has a transmission axis, and the transmission axis has a transmission axis angle that is twice the target rotation angle.

6. A linear polarization component detection method, comprising:

configuring a light source, a linear polarization component to be tested, a wave plate, and a phase retrieval device along an optical path in sequence;

continuously rotating the wave plate;

activating the light source to project a detection beam to pass through the linear polarization component to be tested and the wave plate and transform into a polarized interference beam; and receiving the polarized interference beam through the phase retrieval device and sensing an light intensity signal of the polarized interference beam, wherein the linear polarization component detection method further comprises one of the following steps:

converting the light intensity signal into a phase difference;

recording a rotation angle of the wave plate;

recording the phase difference at the rotation angle correspondingly;

continuously recording the phase difference at the rotation angle to form a phase difference curve; and determining a target rotation angle of the wave plate corresponding to a maximum slope of the phase difference curve.

7. The linear polarization component detection method according to claim 6, wherein the linear polarization component to be tested has a transmission axis, and the transmission axis has a transmission axis angle that is twice the target rotation angle.

8. The linear polarization component detection method according to claim 6, wherein the phase retrieval device further comprises one of the following components:

an image sensor;

a polarizer array configured in one side of the image sensor and comprising a plurality of polarizer units, each of the plurality of polarizer units comprising a 0° linear polarizer, a 90° linear polarizer, a 45° linear polarizer, and a 135° linear polarizer with a common optical path; and a wave plate configured in one side of the polarizer array, wherein the wave plate is selected from either a half-wave plate or a quarter-wave plate.

* * * * *